(12) United States Patent
Hidaka

(10) Patent No.: US 12,401,051 B2
(45) Date of Patent: Aug. 26, 2025

(54) TRANSPORT EQUIPMENT

(71) Applicant: SAIKI HEAVY INDUSTRIES CO., LTD., Saiki (JP)

(72) Inventor: Yutaka Hidaka, Saiki (JP)

(73) Assignee: SAIKI HEAVY INDUSTRIES CO., LTD, Saiki (JP)

( * ) Notice: Subject to any disclaimer, the term of this patent is extended or adjusted under 35 U.S.C. 154(b) by 0 days.

(21) Appl. No.: 18/010,984

(22) PCT Filed: Mar. 17, 2022

(86) PCT No.: PCT/JP2022/012280
§ 371 (c)(1),
(2) Date: Dec. 16, 2022

(87) PCT Pub. No.: WO2023/170983
PCT Pub. Date: Sep. 14, 2023

(65) Prior Publication Data
US 2024/0234769 A1    Jul. 11, 2024

(30) Foreign Application Priority Data

Mar. 10, 2022 (JP) .................................. 2022-037181

(51) Int. Cl.
*H01M 8/0606* (2016.01)
*B63H 21/14* (2006.01)
(Continued)

(52) U.S. Cl.
CPC .......... *H01M 8/0606* (2013.01); *B63H 21/14* (2013.01); *B63H 21/17* (2013.01);
(Continued)

(58) Field of Classification Search
CPC ........... H01M 8/0606; H01M 8/04201; H01M 8/04231; H01M 2250/20; B63H 21/14; B63H 21/17; B63J 3/02
See application file for complete search history.

(56) References Cited

U.S. PATENT DOCUMENTS 10,501,319 B2 * 12/2019 Murata ............... H01M 8/0612
11,149,662 B2    10/2021 Heggen
(Continued)

FOREIGN PATENT DOCUMENTS

JP    2013-517986 A    5/2013
JP    2016-225140 A    12/2016
(Continued)

OTHER PUBLICATIONS

Japanese International Search Report dated May 10, 2022, issued in counterpart International Application No. PCT/JP2022/012280. (3 pages).
(Continued)

*Primary Examiner* — Stephen P Avila
(74) *Attorney, Agent, or Firm* — WHDA, LLP

(57) ABSTRACT

Provided is transport equipment that uses, as fuel, hydrogen produced by reforming ammonia. Transport equipment (100) includes: an ammonia tank (1) configured to store ammonia; and a hydrogen production device (A) configured to produce hydrogen and nitrogen by reforming the ammonia, in which the hydrogen is used as fuel.

11 Claims, 7 Drawing Sheets

(51) Int. Cl.
*B63H 21/17* (2006.01)
*B63J 3/02* (2006.01)
*H01M 8/04082* (2016.01)
*H01M 8/04223* (2016.01)

(52) U.S. Cl.
CPC ........... *B63J 3/02* (2013.01); *H01M 8/04201* (2013.01); *H01M 8/04231* (2013.01); *H01M 2250/20* (2013.01)

(56) References Cited

U.S. PATENT DOCUMENTS

| | | |
|---|---|---|
| 2011/0011354 A1 | 1/2011 | Dincer et al. |
| 2012/0301814 A1 | 11/2012 | Beasley et al. |

FOREIGN PATENT DOCUMENTS

| | | | |
|---|---|---|---|
| JP | 6859475 | B1 | 4/2021 |
| KR | 10-2018-0124365 | A | 11/2018 |
| KR | 102298854 | B1 | 9/2021 |
| KR | 20210141817 | A | 11/2021 |
| KR | 10-2021-0145031 | A | 12/2021 |
| WO | WO-2019035718 | A1 * | 2/2019 ......... F02D 19/0644 |

OTHER PUBLICATIONS

Office Action dated Sep. 28, 2024, issued in counterpart KR Application No. 10-2022-7043841. (5 pages).
Notification of Transmittal of Translation of the International Preliminary Report on Patentability (Form PCT/IB/338) issued in counterpart International Application No. PCT/JP2022/012280 mailed Sep. 19, 2024 with Forms PCT/IB/373, PCT/ISA/237, and PCT/IB/326, with English translation. (12 pages).
Extended (Supplementary) European Search Report dated Nov. 18, 2024, issued in counterpart EP Application No. 22818162.4. (9 pages).
Anonymous: Report on Ammonia-Fueled Ships, Korean Register, Technical Information, No. 2021-ETC-01, p. 1-62, Jan. 31, 2021. (62 pages); cited in Extended European Search Report dated Nov. 18, 2024.
Office Action dated May 29, 2025, issued in counterpart KR Application No. 10-2022-7043841, with English translation. (13 pages).

* cited by examiner

TRANSPORT EQUIPMENT

TECHNICAL FIELD

The present invention relates to transport equipment that uses, as fuel, hydrogen produced by reforming ammonia.

BACKGROUND ART

In April 2018, the greenhouse gas (GHG) reduction strategy of International Maritime Organization (IMO) was adopted, and the need for aiming at GHG zero emission has arisen. In view of the foregoing, hydrogen, ammonia, and the like, which are carbon-free, are being investigated as alternative fuels.

In Patent Literature 1, there is a disclosure of a vessel loaded with ammonia as a combustible gas, in which an internal combustion engine is activated with the ammonia.

CITATION LIST

Patent Literature

PTL 1: Japanese Patent No. 6859475

SUMMARY OF INVENTION

Technical Problem

In combustion of ammonia by the internal combustion engine as disclosed in Patent Literature 1, dinitrogen oxide ($N_2O$), which has a greenhouse effect about 300 times that of carbon dioxide, is produced, and hence GHG zero emission is not achieved. In addition, in Patent Literature 1, an inert gas supply device is required in order to supply an inert gas, and, for example, it is required to mount a large facility such as a nitrogen gas production device.

An object of the present invention is to provide transport equipment that uses, as fuel, hydrogen produced by reforming ammonia.

Solution to Problem

In order to achieve the above-mentioned object, according to the present invention, there is provided transport equipment including: a first container configured to store ammonia; and a hydrogen production device configured to produce hydrogen and nitrogen by reforming the ammonia, wherein the hydrogen is used as fuel.

According to the present invention, the transport equipment that uses, as fuel, hydrogen produced by reforming ammonia can be provided.

DESCRIPTION OF EMBODIMENTS

Now, an exemplary embodiment of the present invention is described in detail based on the attached drawings. Like members are denoted by like reference symbols throughout the drawings, and descriptions of overlapping members are omitted.

Figure 1:
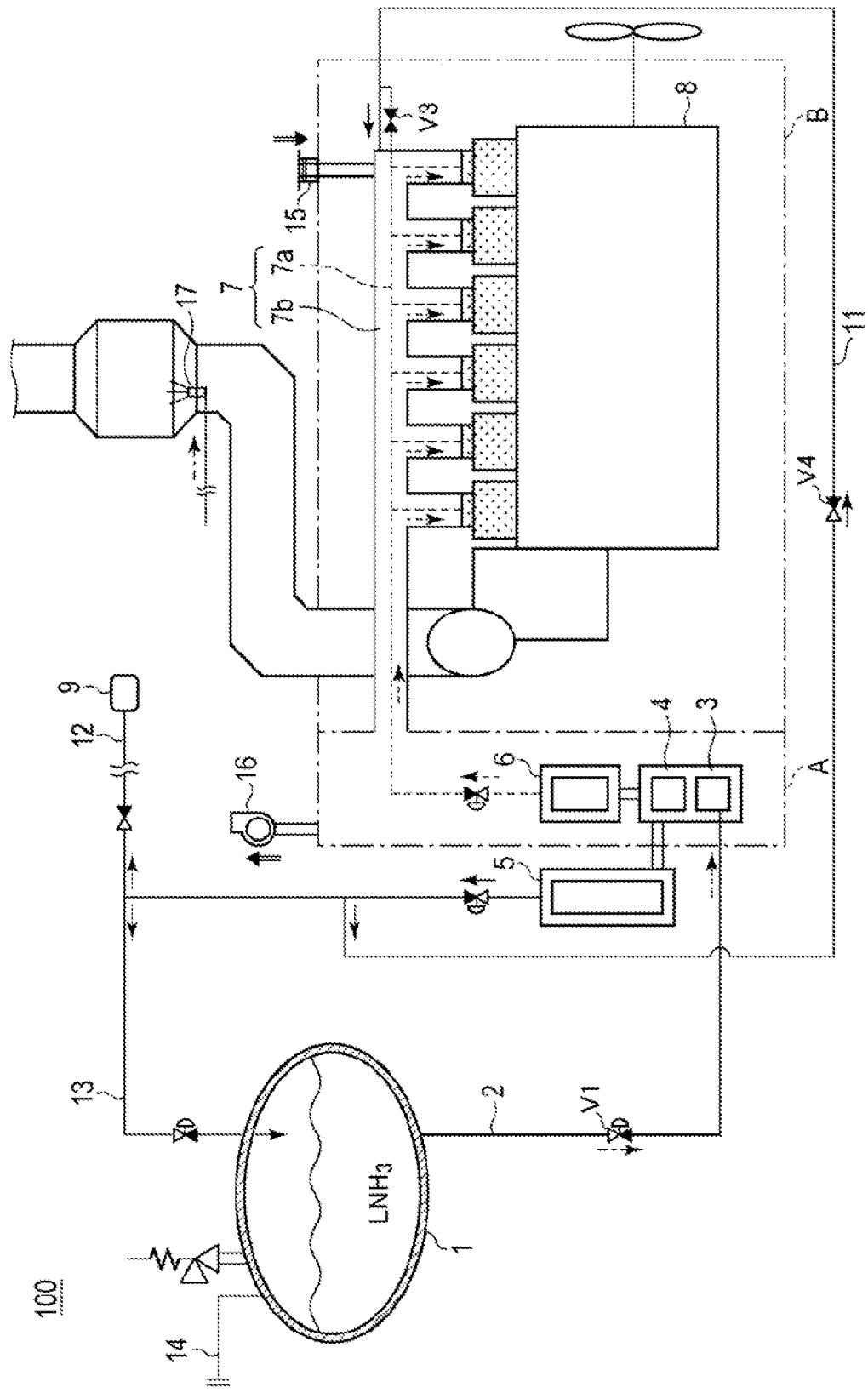
FIG. 1 is a schematic view of transport equipment 100 according to an embodiment of the present invention.

First, the overview of transport equipment 100 in this embodiment is described with reference to FIG. 1. FIG. 1 is a schematic view for illustrating the transport equipment 100 having a power generation system in this embodiment mounted thereon.

The power generation system in this embodiment includes an ammonia tank 1 (first container) that stores ammonia serving as an energy source, a hydrogen production device A that produces hydrogen and nitrogen by reforming ammonia, and an internal combustion engine 8 that uses, as fuel, the produced hydrogen. Alternatively, the power generation system may have a configuration in which a fuel cell and a prime mover are provided instead of the internal combustion engine 8, electricity is generated through use of only hydrogen produced by the hydrogen production device A, and the prime mover is driven with the electricity. Examples of the transport equipment 100 having this system mounted thereon include a vessel, an automobile, a train, an aircraft, and the like.

An embodiment in which the transport equipment 100 is a vessel is described below. A vessel of the embodiment of the present invention has the above-mentioned system mounted on a hull. Examples of the vessel type include a bulk carrier, a container ship, a liquefied gas carrier, a crude oil tanker, a ferry, a RORO ship, an automobile carrier, a passenger ship, and the like.

Figure 2:
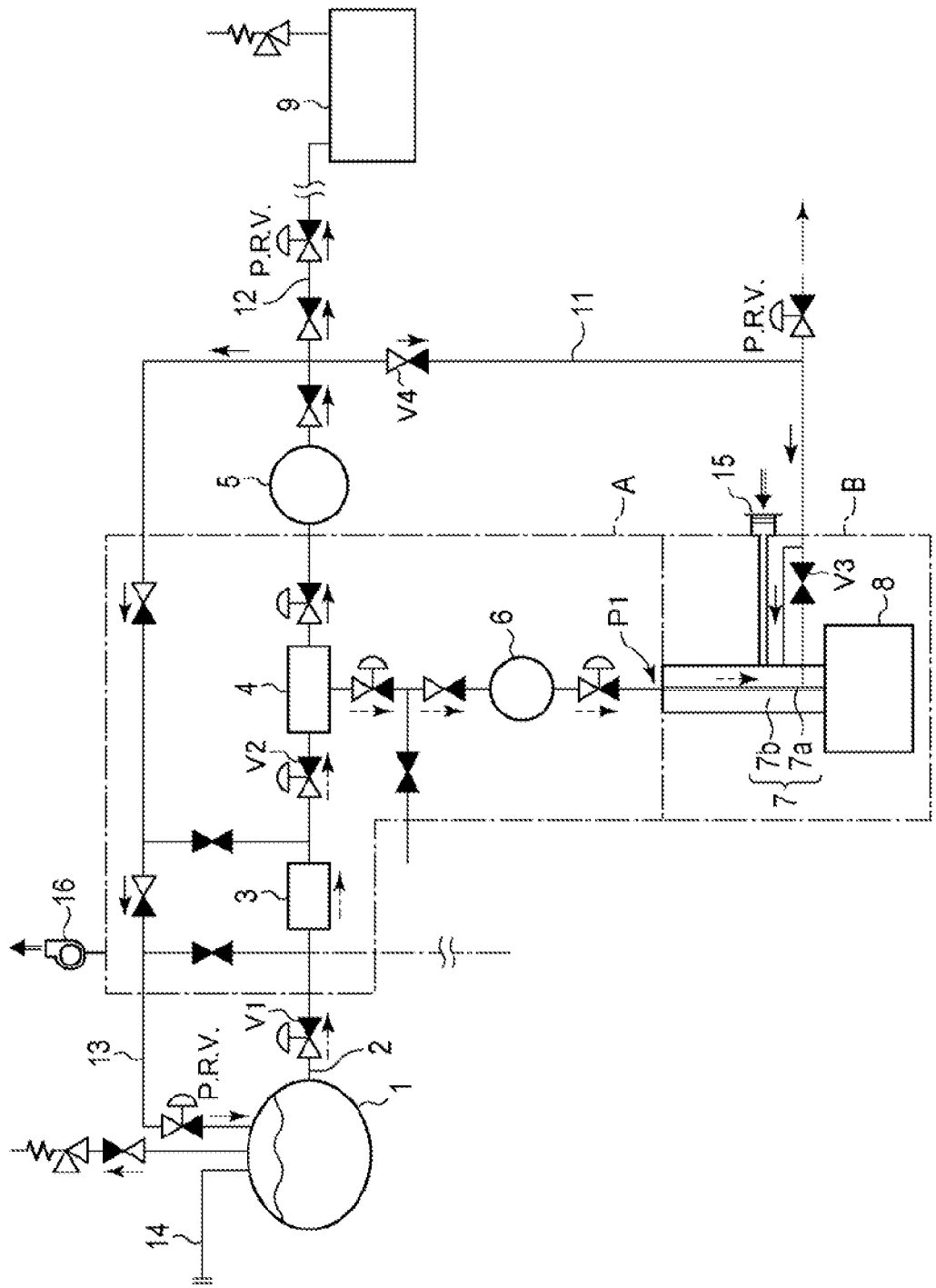
FIG. 2 is a system flow diagram at the time of normal operation.

Next, each constituent member forming the power generation system is described with reference to FIG. 1 and FIG. 2. In FIG. 2, a system flow at the time of normal operation of the power generation system is illustrated.

An ammonia supply line 2 for supplying liquid ammonia ($LNH_3$) to the hydrogen production device A is connected to the ammonia tank 1 mounted on the hull. Further, a tank purge line 13 (third purge line) for purging an inert gas described later, and a bunkering line 14 for replenishing ammonia from outside are also connected to the ammonia tank 1. In the drawings, the flow of ammonia is indicated by dashed-dotted arrows, the flow of hydrogen is indicated by broken arrows, and the flow of nitrogen is indicated by solid arrows.

Liquid ammonia is filled into the ammonia tank 1 from the bunkering line 14. Then, the liquid ammonia is fed to a vaporizer 3 via a control valve V1 through the ammonia supply line 2. In the vaporizer 3, the liquid ammonia is vaporized and fed to a reformer 4 via a control valve V2.

The reformer 4 forms a part of the hydrogen production device A that produces hydrogen and nitrogen by reforming gaseous ammonia. The reformer 4 itself is a general device, and hence the detailed description of the reformer 4 is omitted here. Nitrogen produced by the reformer 4 is separated in the reformer 4 and stored in a nitrogen tank 5 (second container) after being pressurized by a general compressor. Nitrogen temporarily stored in the nitrogen tank 5 is supplied to a desired location as a purge gas. The supply of the purge gas is described later.

Similarly, hydrogen produced by the reformer 4 is separated in the reformer 4 and stored in a hydrogen tank 6 after being pressurized by a general compressor. Hydrogen temporarily stored in the hydrogen tank 6 is supplied to the internal combustion engine 8 through a hydrogen supply line 7. The hydrogen supply line 7 is a so-called double pipe. As illustrated in FIG. 1, an inner pipe 7a indicated by the broken line is formed in a center portion of the double pipe, and an outer pipe 7b is formed so as to surround an outer peripheral portion of the inner pipe 7a. The produced hydrogen is supplied to the internal combustion engine 8 through the inner pipe 7a, and an inert gas is supplied to the outer pipe 7b.

Nitrogen that is an inert gas may be used as the purge gas for purging the hydrogen supply line 7. When the purge gas is supplied, nitrogen is supplied to the outer pipe 7b of the hydrogen supply line 7 that supplies hydrogen. Meanwhile, when hydrogen leakage is detected, nitrogen is supplied also to the inner pipe 7a.

The internal combustion engine 8 in this embodiment generates power through use of, as fuel, hydrogen produced by reforming ammonia on board. The vessel that is the transport equipment 100 can be propelled with the power generated by the internal combustion engine 8. Meanwhile, it is also conceivable to install a hydrogen fuel tank on board and use hydrogen as fuel. However, hydrogen has a volume 4.5 times that of heavy oil even in a liquid form, and hence has a large fuel volume, and in addition, it is required to set the temperature to −253° C. in order to keep the liquefied state. Thus, the conditions for the structure of a tank are severe. In addition, a hydrogen bunkering technology is immature, and the supply infrastructure is underdeveloped. Further, there are problems in that it is required to take measures against hydrogen leakage, boil-off gas (BOG), and brittleness of the tank.

In addition, an ammonia combustion ship that obtains power by combusting ammonia directly in an internal combustion engine is also conceivable. However, establishment of combustion control of ammonia that is flame-retardant and measures against N₂O in exhaust gas are required. In addition, there are problems, such as the immaturity of a technology for exclusively combusting ammonia.

In this embodiment, through use of ammonia as primary fuel, it is theoretically possible to reduce the volume to about two-thirds as compared to the hydrogen fuel tank. That is, as represented by the following formula:

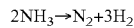

$$2NH_3 \rightarrow N_2 + 3H_2$$

Hydrogen having a volume 1.5 times that of ammonia can be obtained by reforming ammonia. In this manner, the ammonia tank 1 can be downsized as compared to the hydrogen fuel tank.

In addition, in this embodiment, the hydrogen tank 6 is used as a temporary buffer tank for the produced hydrogen, and hence it is not required to maintain the cryogenic temperature (−253° C.) required in the hydrogen fuel tank or take measures against BOG. In addition, the problem of combustibility of ammonia and the problem of the production of N₂O can be simultaneously solved through use of, as fuel, hydrogen obtained by reforming ammonia.

According to this embodiment, the transport equipment 100 that uses, as fuel, hydrogen produced by reforming ammonia can be provided.

In addition, when it is required to install a urea selective catalytic reduction (SCR) 17 for purification of exhaust gas, ammonia may be supplied from the ammonia tank 1 to the urea SCR 17.

Next, purging with nitrogen produced simultaneously with the production of hydrogen is described with reference to FIG. 1 and FIG. 2. Nitrogen produced by reforming is pressurized and stored in the nitrogen tank 5. A fuel pipe purge line 11 (first purge line) is connected from the nitrogen tank 5 to the hydrogen supply line 7. The hydrogen supply line 7 is a double pipe formed of the inner pipe 7a and the outer pipe 7b surrounding the outer side of the inner pipe 7a. One end side of the hydrogen supply line 7 is connected to the internal combustion engine 8, and the other end side thereof is connected to the hydrogen production device A. Hydrogen serving as fuel is supplied to a fuel valve of the internal combustion engine 8 through the inner pipe 7a.

A region in which the internal combustion engine 8 and the hydrogen supply line 7 are provided is a gas safety engine area B. The gas safety engine area B includes an exhaust ventilation port 15, and a pipe is connected from the ventilation port 15 to the outer pipe 7b of the hydrogen supply line 7. Then, an exhaust fan 16 is connected to the hydrogen production device A. Owing to the ventilation port 15 and the exhaust fan 16, the outer pipe 7b of the hydrogen supply line 7 and the hydrogen production device A can perform ventilation of sending air at least 30 times per hour. In addition, the ventilation may be performed more preferably 10 times per hour.

As another example, nitrogen may be supplied from the fuel pipe purge line 11 connected to the outer pipe 7b of the hydrogen supply line 7. Nitrogen is supplied from a position farthest from the hydrogen tank 6 in the hydrogen supply line 7, and the direction in which nitrogen flows is opposite to the direction in which hydrogen is supplied in the inner pipe 7a. With this configuration, hydrogen can be supplied to the internal combustion engine 8 more safely.

Next, purging at the time of detection of hydrogen leakage by a sensor or the like (not shown) is described. When hydrogen leakage is detected, the ventilation port 15 is closed, and the supply of hydrogen from the hydrogen tank 6 is stopped. Then, a control valve V3 of the fuel pipe purge line 11 is opened so that nitrogen is automatically filled into both the inner pipe 7a and the outer pipe 7b. With this configuration, hydrogen in the inner pipe 7a of the hydrogen supply line 7 can be prevented from leaking into the gas safety engine area B. Alternatively, nitrogen is supplied to the hydrogen supply line 7 at a pressure (P2) higher than a hydrogen supply pressure P1.

A cargo hold purge line 12 (second purge line) is connected from the nitrogen tank 5 to a cargo hold 9. The produced nitrogen is supplied to the cargo hold 9 through the cargo hold purge line 12. The cargo hold 9 may store, for example, flammable substances such as crude oil, and hence the cargo hold 9 is filled with nitrogen as an inert gas.

The tank purge line 13 is connected from the nitrogen tank 5 to the ammonia tank 1. The produced nitrogen is supplied to the ammonia tank 1 through the tank purge line 13. Ammonia is used as fuel, and hence the ammonia in the ammonia tank 1 is decreased. However, when the ammonia tank 1 is purged with nitrogen, the ammonia tank 1 is kept at an optimum pressure. The purge pressure is determined based on the temperature and pressure within the ammonia tank 1 and is set so as to keep the ammonia within the ammonia tank 1 in a liquefied state.

Figure 3:
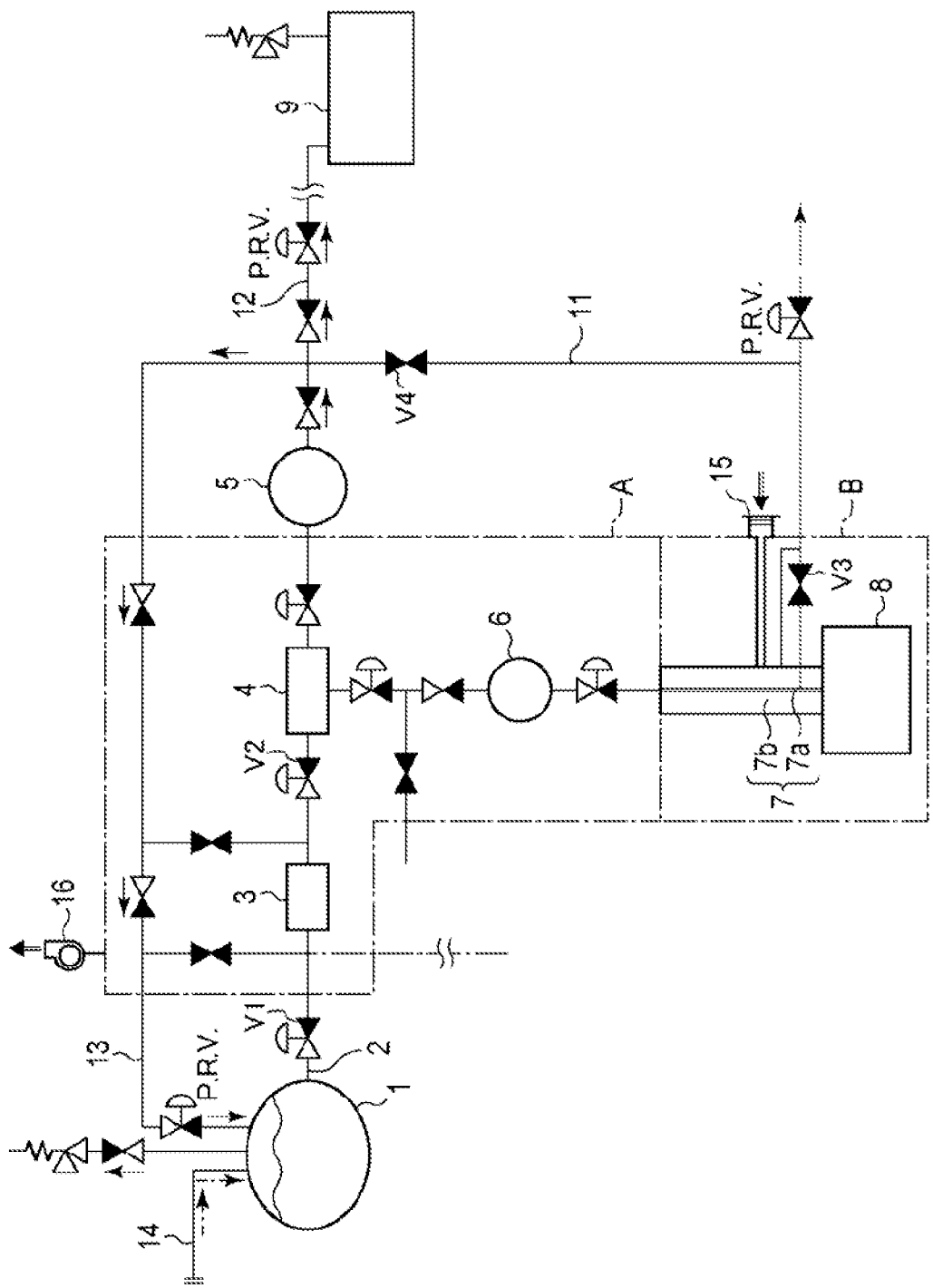
FIG. 3 is a system flow diagram at the time of replenishment of ammonia.

Next, purging at the time of replenishment of fuel is described with reference to FIG. 3. In FIG. 3, a system flow at the time of replenishing the ammonia tank 1 with ammonia is illustrated. The produced nitrogen is pressurized and stored in the nitrogen tank 5. The internal combustion engine 8 is stopped at the time of replenishment of fuel, and hence no hydrogen is supplied to the internal combustion engine 8.

Then, a control valve V4 in the fuel pipe purge line 11 is closed, and no nitrogen is supplied to the hydrogen supply line 7.

The cargo hold 9 is purged with nitrogen from the cargo hold purge line 12 also at the time of replenishment of fuel. This is because it is always required to purge flammable substances and the like with an inert gas.

In addition, the ammonia tank 1 is purged with nitrogen from the tank purge line 13 also at the time of replenishment of fuel. That is, the ammonia tank 1 and the ammonia supply line 2 are subjected to inerting with nitrogen before being ventilated with dry air in order to avoid the formation of an explosive hazardous atmosphere inside the ammonia tank 1 and the ammonia supply line 2. In addition, liquid ammonia (anhydrous) has the risk of generating static electricity, which may serve as an ignition source, and hence care should be taken so as not to spray the liquid ammonia into the empty ammonia tank 1 in which air is present.

According to this embodiment, through use of, as a purge gas, nitrogen obtained by reforming ammonia, it is not required to additionally provide an inert gas supply device that supplies an inert gas, and the effective use of a space, such as the enlargement of the cargo hold 9 and the increase in size of the fuel tank, can be performed. In addition, an additional facility is not required, and hence cost can also be reduced.

Example 1

Figure 4:
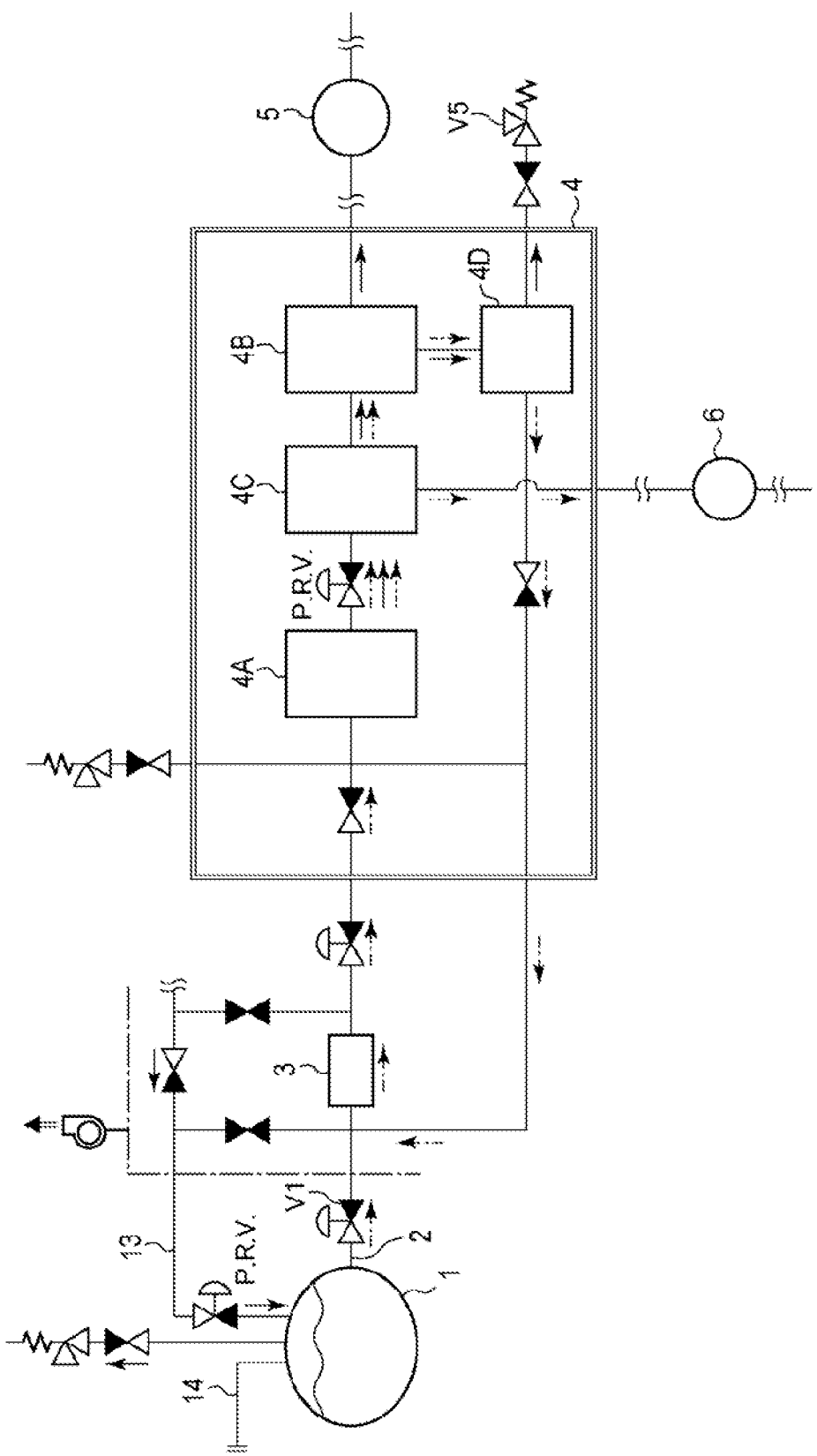
FIG. 4 is a configuration view of a reformer 4 in Example 1.

Example 1 of the present invention is described with reference to FIG. 4. In FIG. 4, a configuration of the periphery of the reformer 4 in Example 1 is illustrated. The ammonia vaporized by the vaporizer 3 is reformed in a catalyst tank 4A in the reformer 4, and the reformed gas contains hydrogen (broken arrows), nitrogen (solid arrows), and residual ammonia (dashed-dotted arrows). The reformed gas has hydrogen separated therefrom by a hydrogen separation pressure swing adsorption (PSA) device 4C arranged on a downstream side of the catalyst tank 4A, and the separated hydrogen is fed from a hydrogen output pipe of the hydrogen separation PSA device 4C to the hydrogen tank 6.

Meanwhile, the gas containing nitrogen and residual ammonia, which have not been separated by the hydrogen separation PSA device 4C, has nitrogen separated therefrom by a nitrogen separation PSA device 4B arranged on a downstream side of the hydrogen separation PSA device 4C. The separated nitrogen is fed from a nitrogen output pipe of the nitrogen separation PSA device 4B to the nitrogen tank 5. The residual ammonia left after separation in the nitrogen separation PSA device 4B contains some residual nitrogen.

The residual ammonia is liquefied by a reliquefaction device 4D arranged on a downstream side of the nitrogen separation PSA device 4B, and the residual nitrogen is separated at the time of this liquefaction. Then, the residual ammonia is reduced to an upstream side of the vaporizer 3 as liquid ammonia. The reliquefaction device 4D used in Example 1 is formed of a compressor. Ammonia can be liquefied by being pressurized to 8 atmospheres or more at room temperature, and hence ammonia is easily liquefied in the reliquefaction device 4D. The reliquefaction device 4D is provided with a safety valve V5 for safety.

Example 1 of the present invention has a configuration in which the purity of hydrogen is about 90% and the balance contains about 10% nitrogen. The residual ammonia is completely removed, and high-purity hydrogen and some nitrogen are supplied to the internal combustion engine 8. Then, in the entire operating range of the internal combustion engine 8, the internal combustion engine 8 generates power through use of, as fuel, only the hydrogen produced by the reformer 4 of the hydrogen production device A. In addition, the produced nitrogen can be utilized as the purge gas, and hence there is obtained an excellent effect in that it is not required to provide an additional nitrogen production device or nitrogen container.

In Example 1, the purity of hydrogen is high. Because of this, a fuel cell and a prime mover may be provided instead of the internal combustion engine 8 so that the fuel cell may generate electricity through use of only the hydrogen produced by the reformer 4 of the hydrogen production device A, and the prime mover may be driven with this electricity to generate power. Thus, in Example 1, high-purity hydrogen is combusted, and hence greenhouse gas emission can be reduced to almost zero.

Example 2

Figure 5:
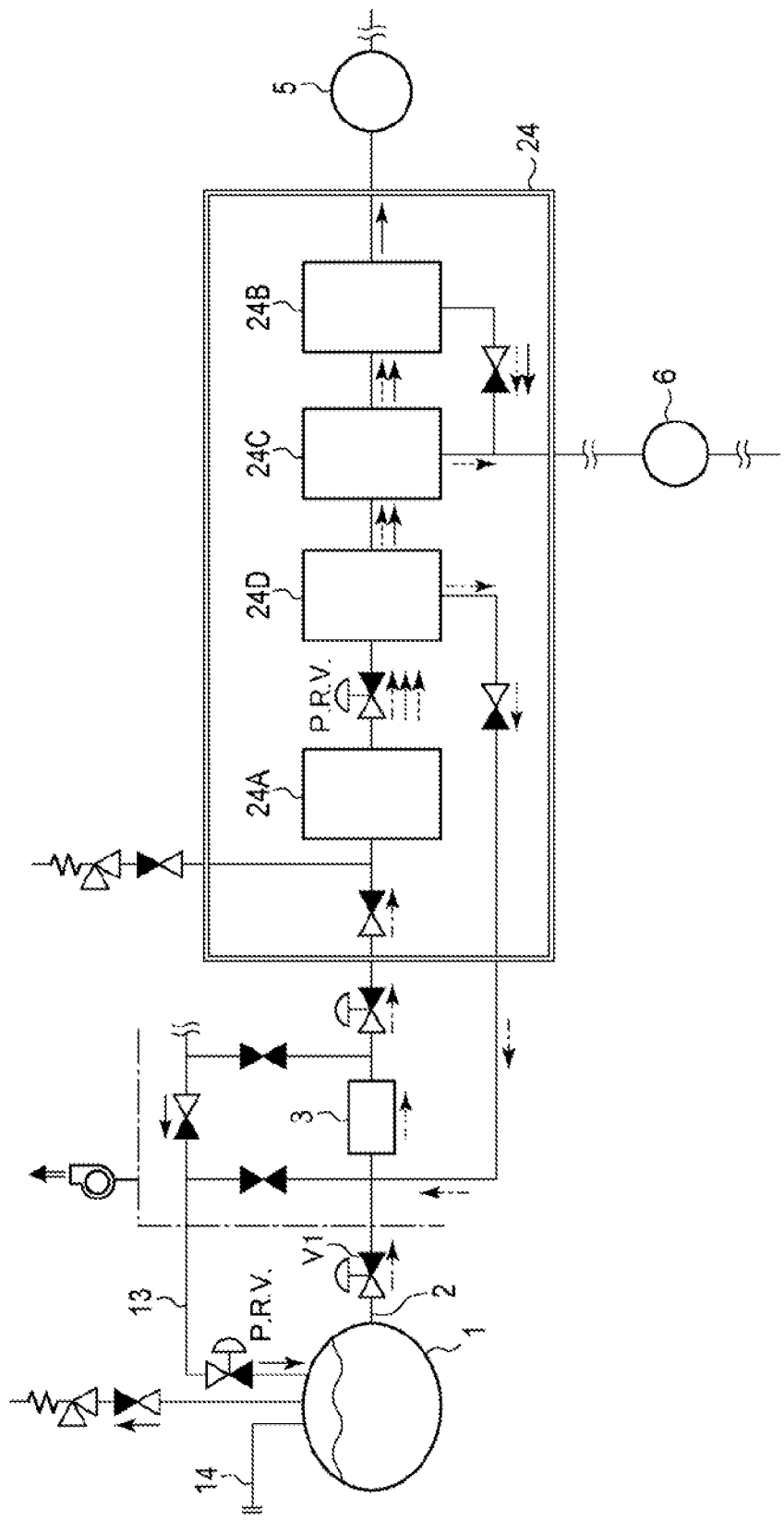
FIG. 5 is a configuration view of a reformer 24 in Example 2.

Next, Example 2 of the present invention is described with reference to FIG. 5. In FIG. 5, a configuration of a periphery of a reformer 24 in Example 2 is illustrated. Similarly to Example 1, the ammonia vaporized by the vaporizer 3 is reformed in a catalyst tank 24A in the reformer 24, and the reformed gas contains hydrogen, nitrogen, and residual ammonia. The residual ammonia in the reformed gas is liquefied by a reliquefaction device 24D arranged on a downstream side of the catalyst tank 24A, and is reduced to an upstream side of the vaporizer 3 as liquid ammonia.

The reliquefaction device 24D used in Example 2 is formed of a cooler. Ammonia can be liquefied by being cooled to, for example, −33° C. or less, and hence ammonia is easily liquefied by the reliquefaction device 24D.

Then, the gas containing hydrogen and nitrogen that has passed through the reliquefaction device 24D has hydrogen separated therefrom by a hydrogen separation PSA device 24C arranged on a downstream side of the reliquefaction device 24D, and the separated hydrogen is fed from a hydrogen output pipe of the hydrogen separation PSA device 24C to the hydrogen tank 6.

Meanwhile, the nitrogen that has not been separated by the hydrogen separation PSA device 24C contains some residual hydrogen, and this gas has nitrogen separated therefrom by a nitrogen separation PSA device 24B arranged on a downstream side of the hydrogen separation PSA device 24C. The separated nitrogen is fed from a nitrogen output pipe of the nitrogen separation PSA device 24B to the nitrogen tank 5. Residual hydrogen left after separation in the nitrogen separation PSA device 24B is fed to the hydrogen tank 6. In addition, it is difficult to completely separate nitrogen in the nitrogen separation PSA device 24B, and hence some nitrogen is also fed to the hydrogen tank 6.

Example 2 of the present invention also has a configuration in which the purity of hydrogen is about 90% and the balance contains about 10% nitrogen. The residual ammonia is completely removed, and high-purity hydrogen and some nitrogen are supplied to the internal combustion engine 8. Also in Example 2 of the present invention, the same effects as those in Example 1 are obtained.

Example 3

Figure 6:
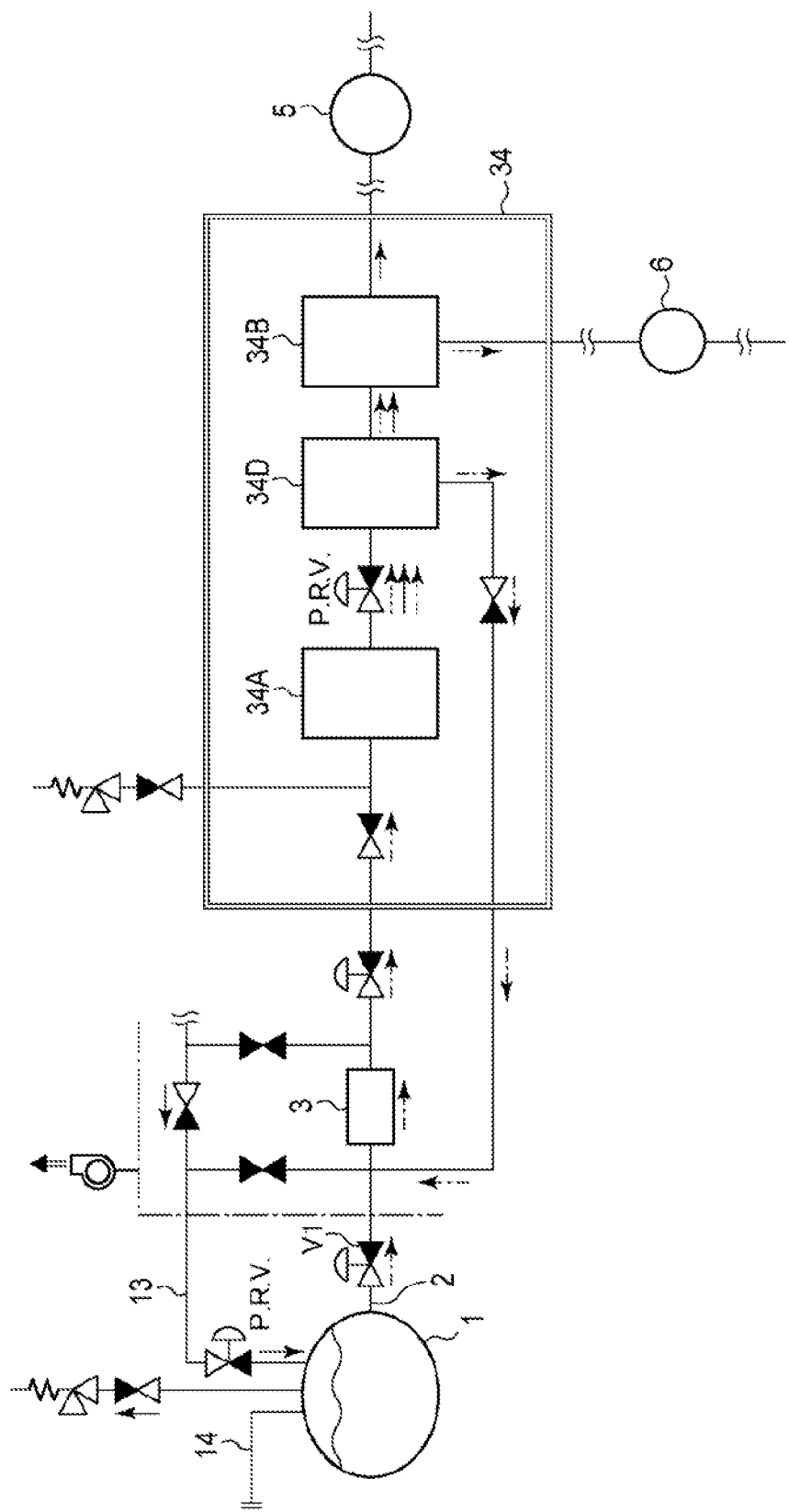
FIG. 6 is a configuration view of a reformer 34 in Example 3.

Next, Example 3 of the present invention is described with reference to FIG. 6. In FIG. 6, a configuration of a periphery of a reformer 34 in Example 3 is illustrated. Similarly to Example 1, the ammonia vaporized by the vaporizer 3 is reformed in a catalyst tank 34A in the reformer 34, and the reformed gas contains hydrogen, nitrogen, and residual ammonia. As compared to Example 2, Example 3 has a configuration in which the hydrogen separation PSA device 24C in Example 2 is omitted, and further, a nitrogen membrane separation device 34B using membrane separation is provided instead of the nitrogen separation PSA device 24B.

Only nitrogen cannot be separated by PSA from the gas containing hydrogen and nitrogen that has passed through a reliquefaction device 34D, and hence the nitrogen membrane separation device 34B using membrane separation is used in Example 3. Then, nitrogen is separated by the nitrogen membrane separation device 34B arranged on a downstream side of the reliquefaction device 34D, and the separated nitrogen is fed from a nitrogen output pipe of the nitrogen membrane separation device 34B to the nitrogen tank 5.

Meanwhile, the gas that has not been separated by the nitrogen membrane separation device 34B contains hydrogen, and this gas is fed from an output pipe different from the nitrogen output pipe of the nitrogen membrane separation device 34B to the hydrogen tank 6.

Example 3 of the present invention also has a configuration in which the purity of hydrogen is about 90% and the balance contains about 10% nitrogen. The residual ammonia is completely removed, and high-purity hydrogen and some nitrogen are supplied to the internal combustion engine 8. Also in Example 3 of the present invention, the same effects as those in Example 1 are obtained.

Example 4

Figure 7:
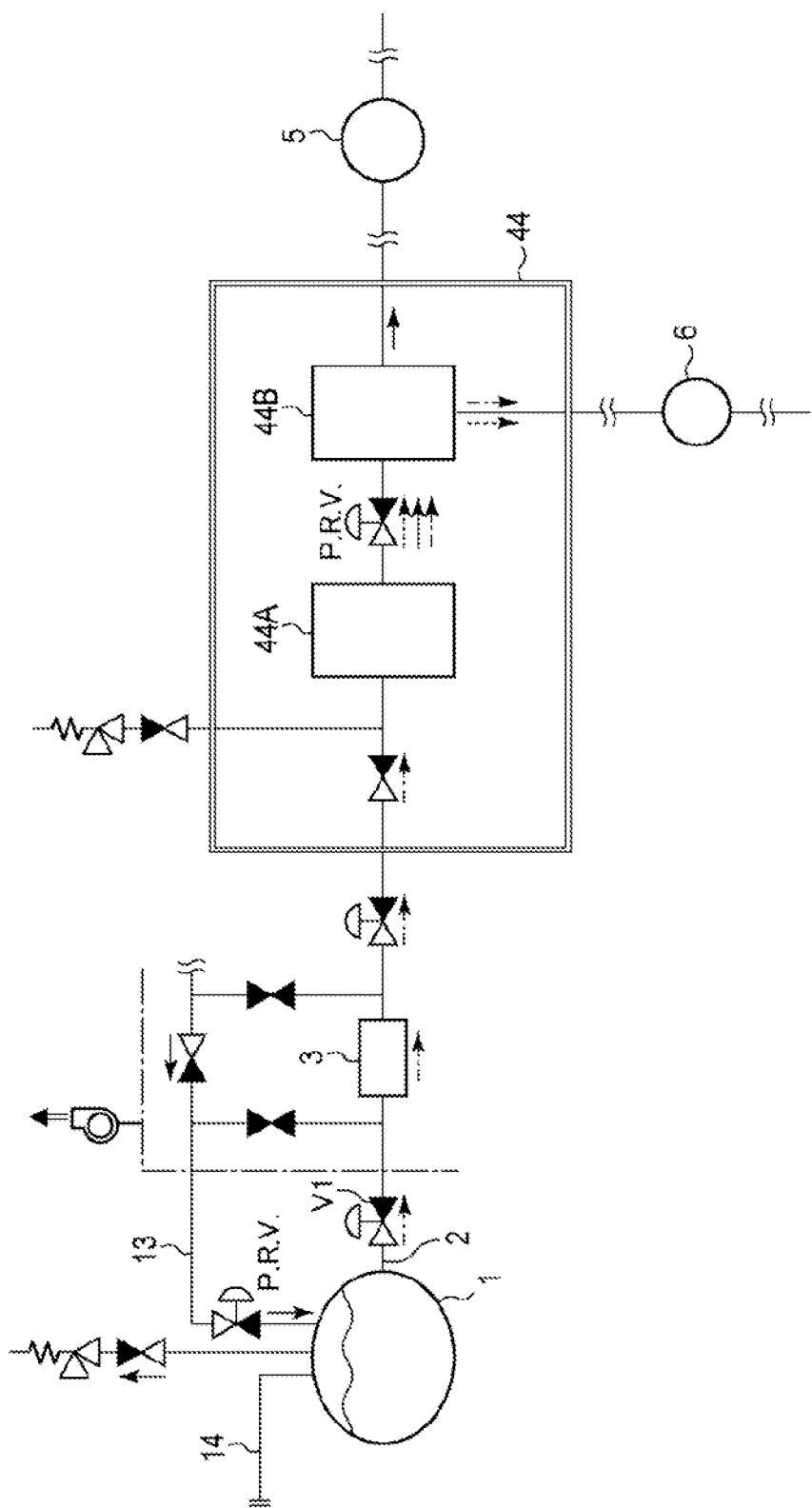
FIG. 7 is a configuration view of a reformer 44 in Example 4.

Next, Example 4 of the present invention is described with reference to FIG. 7. In FIG. 7, a configuration of a periphery of a reformer 44 in Example 4 is illustrated. Similarly to Example 1, the ammonia vaporized by the vaporizer 3 is reformed in a catalyst tank 44A in the reformer 44, and the reformed gas contains hydrogen, nitrogen, and residual ammonia. As compared to Example 3, Example 4 has a configuration in which the reliquefaction device 34D in Example 3 is omitted.

Only nitrogen cannot be separated by PSA from the gas containing hydrogen, nitrogen, and residual ammonia that has passed through the catalyst tank 44A, and hence, similarly to Example 3, a nitrogen membrane separation device 44B using membrane separation is used in Example 4. Then, nitrogen is separated by the nitrogen membrane separation device 44B arranged on a downstream side of the catalyst tank 44A, and the separated nitrogen is fed from a nitrogen output pipe of the nitrogen membrane separation device 44B to the nitrogen tank 5.

Meanwhile, the gas that has not been separated by the nitrogen membrane separation device 44B contains hydrogen and residual ammonia, and this gas is fed from an output pipe different from the nitrogen output pipe of the nitrogen membrane separation device 44B to the hydrogen tank 6.

Example 4 of the present invention has a configuration in which the purity of hydrogen is about 90% and the balance contains about 1% to 10% nitrogen, with several percent of residual ammonia remaining. High-purity hydrogen, some nitrogen, and a small amount of residual ammonia are supplied to the internal combustion engine 8, resulting in co-combustion of hydrogen and ammonia. That is, the internal combustion engine 8 co-combusts the hydrogen produced by the reformer 44 of the hydrogen production device A and the residual ammonia to generate power.

A simple apparatus as in Example 4 enables flame-retardant ammonia to be easily co-combusted. In addition, high-purity hydrogen is combusted, and hence greenhouse gas emission can be suppressed to be significantly low. When it becomes possible to treat $N_2O$ in the future, GHG zero emission can be achieved even with co-combustion of ammonia in the configuration of Example 4. Further, through use of, as a purge gas, nitrogen obtained by reforming ammonia, it is not required to separately provide a nitrogen gas production device, and the space of a hull can be effectively utilized.

Exemplary Examples of the present invention are described above, but the present invention is not limited to Examples and can be modified and changed variously within the scope of the gist thereof.

This application claims the benefit of priority from Japanese Patent Application No. 2022-037181, filed on Mar. 10, 2022, the content of which is incorporated herein by reference.

REFERENCE SIGNS LIST 1 ammonia tank (first container)
5 nitrogen tank (second container)
7 hydrogen supply line
8 internal combustion engine
9 cargo hold
100 transport equipment
A hydrogen production device
P1 supply pressure
P2 pressure

The invention claimed is:

1. Transport equipment comprising:
a first container configured to store ammonia;
a hydrogen production device configured to produce hydrogen and nitrogen by reforming the ammonia;
a second container configured to store the nitrogen produced by the hydrogen production device; and
a hydrogen engine,
wherein the hydrogen is used as fuel for the hydrogen engine, and
wherein the nitrogen is supplied as a purge gas.

2. A transport equipment comprising:
a first container configured to store ammonia;
a hydrogen production device configured to produce hydrogen and nitrogen by reforming the ammonia; and
a second container configured to store the nitrogen produced by the hydrogen production device,
wherein the hydrogen is used as fuel, and
wherein the nitrogen is supplied to a hydrogen supply line configured to supply the hydrogen as a purge gas.

3. The transport equipment according to claim 1, wherein, when the purge gas is supplied, the purge gas is supplied to a hydrogen supply line configured to supply the hydrogen.

4. The transport equipment according to claim 2, wherein, in the hydrogen supply line, a direction in which the purge gas flows is opposite to a direction in which the hydrogen is supplied.

5. The transport equipment according to claim 2, wherein the purge gas is supplied to the hydrogen supply line at a pressure higher than a supply pressure of the hydrogen.

6. The transport equipment according to claim 1, further comprising a cargo hold,
wherein the purge gas is supplied to the cargo hold.

7. The transport equipment according to claim 1, wherein the purge gas is supplied to the first container.

8. The transport equipment according to claim 1, wherein the transport equipment is a vessel.

9. The transport equipment according to claim 2, further comprising an internal combustion engine,
- wherein the internal combustion engine is configured to generate power through use of, as fuel, only the hydrogen produced by the hydrogen production device, and
- wherein the transport equipment is driven with the power.

10. The transport equipment according to claim 2, further comprising an internal combustion engine,
- wherein the internal combustion engine is configured to generate power by co-combusting the hydrogen produced by the hydrogen production device and the ammonia, and
- wherein the transport equipment is driven with the power.

11. The transport equipment according to claim 2, further comprising a fuel cell and a prime mover,
- wherein the fuel cell is configured to generate electricity through use of the hydrogen produced by the hydrogen production device, and
- wherein the prime mover is driven with the electricity.

\* \* \* \* \*